United States Patent [19]

Gregory et al.

[11] Patent Number: 5,374,301

[45] Date of Patent: Dec. 20, 1994

[54] INKS SUITABLE FOR USE IN INK JET PRINTING

[75] Inventors: Peter Gregory, Bolton; Ronald W. Kenyon, Manchester, both of England

[73] Assignee: Zeneca Limited, London, England

[21] Appl. No.: 983,170

[22] Filed: Nov. 30, 1992

Related U.S. Application Data

[63] Continuation-in-part of Ser. No. 723,323, Jun. 28, 1991, Pat. No. 5,268,459.

[30] Foreign Application Priority Data

Jul. 26, 1990 [GB] United Kingdom ............... 9016448
Sep. 24, 1992 [GB] United Kingdom ............... 9217963

[51] Int. Cl.⁵ .................................................. C09D 11/02
[52] U.S. Cl. ....................... 106/22 K; 106/20 D;
   534/637; 534/664; 534/665; 534/672; 534/758;
   534/797; 534/817
[58] Field of Search .................. 106/22 K, 20 D;
   534/637, 664, 665, 667, 672, 758, 797, 817

[56] References Cited

U.S. PATENT DOCUMENTS

| | | | |
|---|---|---|---|
| 1,594,828 | 8/1926 | Geller | 534/672 |
| 1,808,849 | 6/1931 | Heintrich et al. | 534/664 |
| 1,845,426 | 2/1932 | Latten | 534/665 X |
| 2,696,486 | 12/1954 | Gunst | 534/664 |
| 2,777,840 | 1/1957 | Liechti et al. | 534/672 |
| 3,945,990 | 3/1976 | Ikeda et al. | 534/794 |
| 4,474,696 | 10/1984 | Takahashi et al. | 534/634 |
| 4,605,442 | 8/1986 | Kawashita et al. | 106/22 K |
| 4,661,158 | 4/1987 | Kobayashi et al. | 106/22 K |
| 4,804,411 | 2/1989 | Eida et al. | 106/22 K |
| 4,843,150 | 6/1989 | Hihara et al. | 534/634 |
| 4,997,919 | 3/1991 | Schaulin | 534/797 X |

FOREIGN PATENT DOCUMENTS

| | | | |
|---|---|---|---|
| 2555533 | 7/1976 | Germany | 534/797 |
| 102972 | 6/1982 | Japan | 106/22 K |
| 8775 | 1/1984 | Japan | 106/22 K |
| 4763 | 1/1987 | Japan | 106/22 K |

OTHER PUBLICATIONS

English translation of JP57/102972, 1982.

*Primary Examiner*—Helene Klemanski
*Attorney, Agent, or Firm*—Cushman, Darby & Cushman

[57] ABSTRACT

An ink comprising a liquid medium and a compound of Formula (1) or salt thereof:

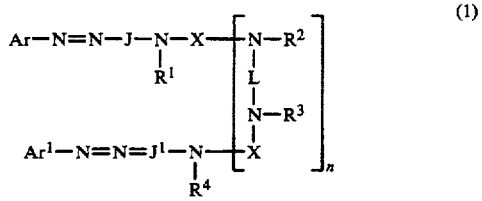

provided (i) if the compound of Formula (1) has no —SO₃H groups then it has at least two groups selected from —COOH and —COSH; and (ii) the compound of Formula (1) has at least as many groups selected from —COOH and —COSH as —SO₃H groups. The inks are useful for ink-jet printing.

17 Claims, No Drawings

INKS SUITABLE FOR USE IN INK JET PRINTING

This application is a continuation-in-part of Ser. No. 723,323, filed Jun. 28, 1991 now U.S. Pat. No. 5,268,459.

This invention relates to inks, particularly inks containing volatile amine salts of azo compounds which are useful in ink jet printing.

According to the present invention there is provided an ink comprising a liquid medium and a compound of Formula (1) or salt thereof:

$$Ar-N=N-J-N(R^1)-X-[N(R^2)-L-N(R^3)-X-]_n$$
$$Ar^1-N=N-J^1-N(R^4)-X$$
(1)

wherein:
Ar and $Ar^1$ are each independently aryl or substituted aryl providing at least one of Ar and $Ar^1$ has at least one substituent selected from COOH and COSH;

J and $J^1$ are each independently of formula (2), (3) or (4):

(2) [phenylene with $R^5$ substituent]

(3) [pyridone ring with T, W, HO, N(m)—, =O]

(4) [pyrazole ring with B, HO, N—N, phenyl with $R^5$]

each $R^5$ is independently selected from H, alkyl, substituted alkyl, alkoxy, halogen, CN, ureido and $NHCOR^6$;

$R^6$ is H, alkyl, substituted alkyl, aryl, substituted aryl, aralkyl or substituted aralkyl;

each T is independently alkyl;

each W is independently selected from H, CN, $CONR^{10}R^{11}$, pyridinium and COOH;

each m is an alkylene chain having 2 to 8 carbon atoms;

B is H, alkyl or COOH;

$R^1$, $R^2$, $R^3$, $R^4$, $R^{10}$ and $R^{11}$ are each independently H, alkyl or substituted alkyl;

L is a divalent organic linking group;

n is 0 or 1 each X is independently carbonyl or a group of the Formula (5), (6) or (7):

(5) [triazine ring with Z]

(6) [ring with Z and Y]

(7) [pyridine with Cl, Z, E]

Z is $OR^7$, $SR^7$ or $NR^8R^9$;
Y is H, Cl, CN or Z;
E is Cl or CN;
$R^7$, $R^8$ and $R^9$ are independently H, alkenyl, substituted alkenyl, alkyl, substituted alkyl, aryl, substituted aryl, aralkyl or substituted aralkyl, or $R^8$ and $R^9$ together with the nitrogen atom to which they are attached form a 5 or 6 membered ring; provided (i) if the compound of Formula (1) has no $-SO_3H$ groups then it has at least two groups selected from $-COOH$ and $-COSH$; and (ii) the compound of Formula (1) has at least as many groups selected from $-COOH$ and $-COSH$ as $-SO_3H$ groups.

It is preferred that the compound of Formula (1) has at least as many $-COOH$ as $-SO_3H$ groups. The compound of Formula (1) preferably has at least two and more preferably at least three $-COOH$ groups.

It is preferred that $Ar-N=N-J$ and $Ar-N=N-J^1$ are such that the compounds of Formula (1) are yellow. It is also preferred that compounds of Formula (1) are free from cellulose reactive groups. The groups Ar and $Ar^1$ are preferably independently selected from naphthyl, substituted naphthyl, phenyl and substituted phenyl, especially phenyl and substituted phenyl. The optional substituents on Ar and $Ar^1$ are preferably selected from alkyl, especially $C_{1-4}$-alkyl; substituted $C_{1-4}$-alkyl; alkoxy, especially $C_{1-4}$-alkoxy; $-SO_3H$; $-PO_3H_2$; $-COSH$; $-OH$; $-CO_2H$; halogen, especially Cl or Br. It is particularly preferred that when Ar and $Ar^1$ are substituted the substituents are independently selected from $CO_2H$, COSH and $SO_3H$, especially $CO_2H$. In especially preferred structures, at least one of Ar and $Ar^1$ has at least one $-COOH$ substituent but it is even more preferred that each of Ar and $Ar^1$ has at least one $-COOH$ substituent and more particularly at least two $-COOH$ substituents as in, for example, dicarboxyphenyl.

Each $R^5$ is preferably independently selected from H, $C_{1-4}$-alkyl, substituted $C_{1-4}$-alkyl, $C_{1-4}$-alkoxy, Cl, CN, Br, ureido or $NHCOR^6$, more preferably H, $C_{1-4}$-alkyl, $C_{1-4}$-alkoxy, ureido or $NHCO(C_{1-4}$-alkyl), especially H, methyl, methoxy or ureido. Each $R^5$ is preferably ortho with respect to the azo group connected to the same ring.

$R^6$ is preferably H, $C_{1-4}$-alkyl, phenyl or $(CH_2)_{1-4}$-phenyl, all of which are either unsubstituted or substituted. $R^6$ is more preferably $C_{1-4}$-alkyl.

Each T is preferably independently $C_{1-6}$-alkyl, especially $C_{1-4}$-alkyl.

The group (m) present in Formula (3) is branched chain alkylene or preferably straight chain alkylene.

B is preferably H.

When X is of Formula (6) it is preferred that Z is attached to the carbon atom between the two ring nitrogen atoms and that Y is para with respect to Z. Each X independently is preferably of Formula (5).

Z is preferably $NR^8R^9$, especially $NHC_2H_4OH$, $N(C_2H_4OH)_2$, morpholino, $NH(C_{1-6}$-alkyl), $NH$-$(CH_2)_2CO_2H$, $NHCH_2C_6H_4CO_2H$, mono- or di-carboxyanilino, $NHC_6H_4SO_3H$ or $NHCH_2SO_3H$.

$R^1$, $R^2$, $R^3$ and $R^4$ are preferably independently selected from H, $C_{1-4}$-alkyl and $C_{1-4}$-alkyl substituted by OH.

$R^7$, $R^8$ and $R^9$ are preferably independently selected from H, $C_{1-18}$-alkyl, substituted $C_{1-18}$-alkyl, $C_{3-18}$-alkenyl, phenyl, substituted phenyl, $(CH_2)_{1-4}$-phenyl, substituted $(CH_2)_{1-4}$-phenyl, more preferably H, allyl, $C_{1-18}$-alkyl, benzyl, hydroxy $C_{1-4}$-alkyl especially H, methyl, ethyl and 2-hydroxyethyl.

The optional substituents on $R^7$, $R^8$ and $R^9$ are preferably independently selected from —OH, —$SO_3H$ and —COOH, especially —OH. When $R^8$ and $R^9$ together with the nitrogen atom to which they are attached form a 5 or 6 membered ring they preferably form a morpholine, piperazine or piperidine ring.

The identity of the divalent organic linking group L is not critical providing it does not interfere with the performance of the compound. As examples of divalent organic linking groups represented by L there may be mentioned:

(a) divalent aliphatic radicals, preferably those containing from 2 to 6 carbon atoms, especially $C_{2-6}$-alkylene such as ethylene, trimethylene, propylene, tetramethylene, alpha:beta-dimethylethylene and hexamethylene radicals;

(b) divalent aromatic homocyclic radicals in which at least one of the terminal links is through an aliphatic carbon atom, for example as in the benzylene -$C_6H_4.CH_2$— or the xylylene —$CH_2C_6H_4CH_2$- group;

(c) divalent monocyclic or fused polycyclic aromatic radicals, for example optionally substituted phenylene, naphthylene, anthraquinonylene or fluorenylene, such as

| | |
|---|---|
| 1,3- or 1,4-phenylene | 2-nitro-1,4-phenylene |
| 3-sulpho-1,4-phenylene | 4-methoxy-1,3-phenylene |
| 4-sulpho-1,3-phenylene | 4-nitro-1,3-phenylene |
| 2-carboxy-1,4-phenylene | 2-chloro-1,4-phenylene |
| 4-carboxy-1,3-phenylene | 3,7-disulpho-1,5-naphthylene |
| 2-methoxy-1,4-phenylene; | |

(d) divalent radicals wherein the terminal bonds are attached to carbon atoms of two phenyl or naphthalene nuclei which are joined together either through a direct link or through an atom or chain of atoms which my form a homocyclic or heterocyclic ring. Of this type, there my be mentioned as examples divalent radicals derived from

| | |
|---|---|
| diphenyl | azobenzene |

| | |
|---|---|
| diphenyloxide | diphenyloxadiazole |
| diphenylamine | benzanilide |
| diphenylsulphide | diphenylurea |
| diphenylsulphone | 1,2-bis(phenylcarbamyl)ethylene |
| diphenylmethane | 1,4-bis-(phenylcarbamyl)butadiene |
| diphenylketone | 1,2-bis-(phenylcarbamyl)ethane |
| diphenylethane | 1,3-bis-(phenylcarbamyl)propane |
| diphenylethylene | 2,4-dianilino-s-triazine; | and (e) nuclear substituted derivatives of the above, for example, containing COOH, methyl, nitro and/or sulphonic acid and/or chlorine atoms as substituents in the phenyl or naphthalene nuclei.

Alternatively the group $NR^2LNR^3$ can be piperazino in which the two ring nitrogen atoms are bonded to the groups represented by X.

It is to be understood that the present invention relates not only to compounds of Formula (1) but also to the salts thereof, especially the alkali metal, ammonium or substituted ammonium salt, particularly the substituted ammonium salt formed with an amine which is volatile at room temperature. Preferred volatile amines have a vapour pressure of less than 60 mm Hg, more preferably less than 20 mm Hg, at 20° C. and atmospheric pressure. Examples of preferred volatile amines include methylamine, dimethylamine, diethylamine, methylethylamine, propylamine and isopropylamine.

Preferred alkali metal salts are the sodium, potassium and Lithium salts, and mixtures thereof with $NH_4^+$.

The substituted ammonium salt may contain a cation of the formula $^+NQ_4$ in which each Q independently is an organic radical, or two or three Qs together with the nitrogen atom to which they are attached form a heterocyclic ring and all remaining Qs are selected from $C_{1-4}$-alkyl. Preferred organic radicals represented by Q are $C_{1-4}$-alkyl radicals, especially methyl radicals. Preferred heterocyclic rings formed by $NQ_4$ are 5 or 6 membered heterocyclic rings.

As examples of substituted ammonium cations of formula $^+NQ_4$ there may be mentioned $N^+(CH_3)_4$, $N^+(CH_2CH_3)_4$, N-methyl pyridinium, N,N-dimethyl piperidinium and N,N-dimethyl morpholinium.

Preferably the substituted ammonium salt contains a cation of the formula $^+NHG_3$ wherein each G independently is H or $C_{1-4}$-alkyl provided at least one G is $C_{1-4}$-alkyl, or two or three groups represented by G together with the nitrogen atom to which they are attached form a 5 or 6 membered ring, especially a pyridine, piperidine or morpholine ring. It is preferred that the substituted ammonium cation is derived from an amine which is volatile under ambient conditions, i.e. at 20° C. and atmospheric pressure.

As examples of substituted ammonium cations of formula $^+NHG_3$ there may be mentioned $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $CH_3CH_2CH_2N^+H_3$, $(CH_3)_2CHN^+H_3$, isopropylammonium, pyridinium, piperidinium and morpholinium.

According to a further aspect of the present invention there is provided a process for the preparation of compounds of Formula (1) comprising (i) diazotisation of amines of the formulae $ArNH_2$ and $Ar^1NH_2$ with a diazotising agent such as $HNO_2$, in the cold and preferably below 5° C. to give the corresponding diazonium salts; (ii) coupling the diazonium salt formed from $ArNH_2$ with an amine of formula H—J—NR¹H, and coupling the diazonium salt formed from Ar¹NH₂ with an amine of formula H—J¹—NR⁴H to give monoazo amines; (iii) reacting the monoazo amines of step (ii) in either order or simultaneously with a compound of formula Cl—X—(NR²—L—NR³—X)ₙ—Cl, preferably in the presence of base;

wherein Ar, Ar¹, X, R¹ to R⁴, J, J¹, L and n are as defined above unless stated otherwise.

Alternatively, step (iii) my be followed except that in the definition of X above, instead of the substituent Z there is Cl, and the product of step (iii) is reacted with a compound of formula ZH (wherein Z is as hereinbefore defined) to give a compound of Formula (1).

As Examples of amines of formulae ArNH₂ and Ar¹NH₂ which may be used in the preparation of compounds of Formula (1), there may be mentioned

| | |
|---|---|
| 2-aminoisophthalic acid | 3-amino-4-fluorobenzoic acid |
| 4-aminoisophthalic acid | 3-amino-5-hydroxybenzoic acid |
| 5-aminoisophthalic acid | 3-amino-4-hydroxybenzoic acid |
| 3-aminophthalic acid | 3-amino-2-hydroxybenzoic acid |
| 4-aminophthalic acid | 2-amino-6-hydroxybenzoic acid |
| 2-aminoterephthalic acid | 2-amino-4-nirobenzoic acid |
| 3-aminobenzoic acid | 3-amino-5-nitrobenzoic acid |
| 4-aminobenzoic acid | 2-nitro-3-aminobenzoic acid |
| anthranilic acid | 2-nitro-5-aminobenzoic acid |
| 4-sulphoanthranilic acid | 3-nitro-4-aminobenzoic acid |
| 5-sulphoanthranilic acid | 3-acetylamino-5-aminobenzoic acid |
| 2-amino-4-chlorobenzoic acid | 3-amino-4-methylbenzoic acid |
| 2-amino-5-chlorobenzoic acid | 2-amino-3-methylbenzoic acid |
| 3-amino-4-chlorobenzoic acid | 3-amino-4-methoxybenzoic acid |
| 5-amino-2-chlorobenzoic acid | 3-amino-4-hydroxybenzoic acid |
| 2-amino-5-methylbenzoic acid | 4-aminosalicylic acid |
| 2-amino-6-methylbenzoic acid | 5-aminosalicylic acid |
| 2-amino-5-bromobenzoic acid | 3-amino-2-naphthoic acid |
| 2-n-butoxy-4-aminobenzoic acid | 5-amino-2-naphthoic acid |
| | 8-amino-2-naphthoic acid |

The ink preferably contains less than 5%, more preferably less than 2%, especially less than 1% inorganic salts, e.g. NaCl, KCl and NaNO₃, in order to improve solubility of the dye and reduce the tendency to deposition of solids in the jets of an ink jet printer. Inorganic salt content may be lowered to a desired level using a membrane separation process, for example by dialysis of a crude dye in visking tubing or by reverse osmosis.

It is preferred that the compound of Formula (1) is completely dissolved in the liquid medium to form a solution.

The ink preferably contains from 0.5% to 20%, more preferably from 0.5% to 15%, and especially from 1% to 5%, by weight of the compound of Formula (1) based on the total weight of the ink.

The liquid medium is preferably water or an aqueous medium comprising a mixture of water and one or more water-soluble organic solvents, preferably in a weight ratio of water to the solvent(s) from 99:1 to 1:99, more preferably from 95:5 to 50:50 and especially from 90:10 to 60:40.

Each water-soluble organic solvent is preferably a C₁₋₄-alkanol such as methanol, ethanol, n-propanol, isopropanol, n-butanol, sec-butanol, tert-butanol or isobutanol; an amide such as dimethylformamide or dimethylacetamide; an ester such as diacetine; a ketone or ketoalcohol such as acetonemethylethylketone, methylisobutyl ketone or diacetone alcohol; an ether such as tetrahydrofuran or dioxane; a polyalkylene glycol such as polyethylene glycol or polypropylene glycol preferably having molecular weights up to 1000 and especially from 100 to 500; an alkylene glycol containing 2 to 6 carbon atoms such as ethylene glycol, propylene glycol, butylene glycol or triethylene glycol; hexylene glycol or diethylene glycol and thioglycol and the diglycols equivalent thereof; a polyol such as glycerol or 1,2,6-hexanetriol; a lower alkyl ether of a polyhydric alcohol such as 2-methoxyethanol, 2-(2-methoxyethoxy)ethanol, 2-(2-ethoxyethoxy)ethanol, 2-[2-(2-methoxyethoxy)ethoxy]ethanol or 2-[2-(2-ethoxyethoxy)ethoxy]-ethanol; a heterocyclic ketone such as 2-pyrrolidone or N-methylpyrrolidone. The liquid medium preferably contains from 1 to 5 water-soluble organic solvents, more preferably 1, 2 or 3 such solvents.

Preferred water-soluble organic solvents are selected from heterocyclic ketones, especially 2-pyrrolidone and N-methylpyrrolidone; alkylene glycols or lower alkyl ethers of polyhydric alcohols especially ethylene glycol, diethylene glycol and triethylene glycol and especially 2-methoxy-2-ethoxy-2-ethoxyethanol; and polyethylene glycols having a molecular weight of up to 500. A preferred specific solvent mixture is a binary mixture of water and either diethylene glycol, 2-pyrrolidone or N-methylpyrrolidone in a weight ratio as mentioned above.

The ink my contain more than one compounds of Formula (1), for example two or three such compounds.

Examples of suitable ink media are given in U.S. Pat. Nos. 4,963,189, 4,703,113, 4,626,284 and EP 425,150A.

It is preferred that the inks of the present invention further comprise one or more of (a) a penetrant to assist permeation of the dye into a paper substrate, (b) a kogation-reducing agent to prevent or reduce the build-up of residue (koga) on the resistor surface in thermal ink jet printers and (c) a buffer such as sodium borate, to stabilise the pH of the ink.

The kogation-reducing agent is preferably an oxo anion, such as described in EP 425150A. The oxo-anion may be $C_2O_4^{2-}$, $SO_3^{2-}$, $SO_4^{2-}$, molybdate, $AsO_4^{3-}$ or more preferably a phosphate ester, a diorganophosphate or more especially a phosphate salt which is particularly effective in reducing kogation. As examples of phosphate salts there my be mentioned dibasic phosphate ($HPO_4^{2-}$) monobasic phosphates ($H_2PO_4^-$) and polyphosphates ($P_2O_7^{4-}$). The selection of counter ion is not believed to be critical and examples include alkali metals, ammonium and alkylammonium cations.

The kogation-reducing agent is preferably present in the ink at a concentration from 0.001% to 15%, based on oxo-anion, and more preferably from 0.01% to 1% (by weight).

A further aspect of the present invention provides a process for printing a substrate with an ink using an ink jet printer, characterised in that the ink is as hereinbefore defined. A suitable process for the application of an ink as hereinbefore defined comprises forming the ink into small droplets by ejection from a reservoir through a jet so that the droplets of ink are directed at a substrate. This process is commonly referred to as ink jet printing, and the ink jet printing processes for the present inks are preferably piezoelectric ink jet printing, and more especially thermal ink jet printing. In thermal ink jet printing, programmed pulses of heat are applied to the ink by means of a resistor, adjacent to the jet during relative movement between the substrate and the jet.

A preferred substrate is an overhead projector slide or a cellulosic substrate, especially plain paper, which my have an acid, alkaline or neutral character.

The preferred ink used in the process is as hereinbefore described.

According to a still further aspect of the present invention there is provided a paper or an overhead projector slide printed with an ink according to the invention.

The invention is further illustrated by the following Examples in which all parts and percentages are by weight unless otherwise indicated.

EXAMPLE 1

Preparation of an ink containing a dye of the formula:

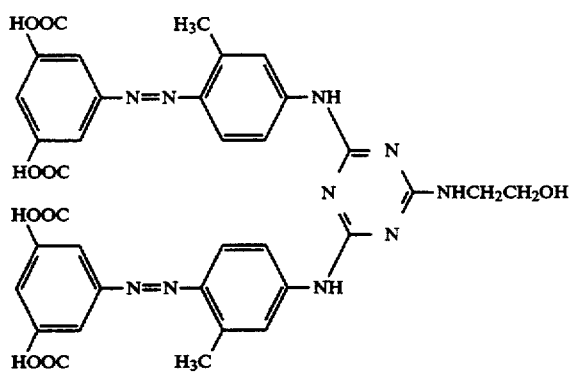

5-aminoisophthalic acid (36.2 g) was stirred in water (1 liter) and the pH adjusted to 8-9 by addition of 2N sodium hydroxide. Sodium nitrite (14 g) was added and the solution added to a mixture of concentrated hydrochloric acid (60 ml) and water (500 ml) at 0°-10° C. After 1 hour at 0°-10° C. the excess nitrous acid was removed by addition of a little sulphamic acid, to give a diazo suspension.

m-toluidine (21.4 g) was added to water (500 ml) and concentrated hydrochloric acid (25 ml) added. The solution was added over ½ hour to the above diazo suspension at 0°-10° C. The pH was adjusted to 4.0 by addition of 47% sodium hydroxide solution and the mixture stirred for 18 hours at 0°-10° C. The pH Was adjusted to 8.0 with 47% sodium hydroxide solution, screened and then warmed to 60° C. It was slowly acidified to pH 4.0 with concentrated hydrochloric acid and the product filtered, washed with water and dried to give a monoazo compound.

8.87 g (one equivalent) of the above monoazo compound was added to water (500 ml) and the pH adjusted to 8.0 by addition of 47% sodium hydroxide solution. It was cooled to 0°-10° C. and a solution of cyanuric chloride (4.61 g, one equivalent) in acetone (50 ml) added maintaining the pH at 7-8 and a temperature of 0°-10° C. After ½ hour a further solution of one equivalent of the above monoazo compound (8.87 g) in water (500 ml) at pH 8.0 was added and the reaction mixture warmed to 45° C. and stirred at this temperature for 4 hours maintaining the pH at 7-8.

2-Aminoethanol (10 g) was then added and the mixture heated to 80° C. After stirring at 80° C. for 2 hours the pH was adjusted to 7.0 and salted to 20% using sodium chloride. The product was filtered and washed with saturated brine.

The above product was dissolved in water (1 liter) and the solution added to 2N hydrochloric acid to precipitate the title product in free acid form. The title product was filtered, washed and added to water (200 ml). The pH was adjusted to 9.0 with concentrated ammonium hydroxide and the solution dialysed to remove chloride ions, screened and evaporated to give the ammonium salts of the title product. Yield = 10 g.

When made into an ink by dissolving in water/diethylene glycol (92.5/7.5) and printed onto plain paper using a thermal ink-jet printing machine the ammonium salt of the title compound gave bright yellow shades with excellent water fastness and good light fastness.

Further inks containing the title dye may be prepared according to the following formulations shown in Table I and Table II wherein figures denote parts by weight for each stated component:

The following Abbreviations are used:
PG = propylene glycol,
DEG = diethylene glycol,
NMP = N-methyl pyrollidone,
DMK = dimethylketone,
IPA = isopropanol,
MEOH = methanol,
2P = 2-pyrollidone,
MIBK = methylisobutyl ketone,
P12 = Propane-1,2-diol,
BDL = Butane-2,3-diol,
CET = Cetyl ammonium bromide,
PHO = Na₂HPO₄, and
TBT = Tertiary butanol.

TABLE I

| Ink No. | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | 1 | |
| 3 | 1.0 | 85 | 5 | | 2 | 2 | | 0.1 | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 1.9 | 70 | | 20 | | | | | 10 | | | |
| 9 | 2.4 | 75 | 5 | 4 | | 5 | | | | | 6 | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 4.6 | 96 | | | | | | | | 4 | | |
| 13 | 0.8 | 90 | 5 | | | | | | 5 | | | |
| 14 | 1.2 | 80 | 2 | 6 | 2 | 5 | | | 1 | | 4 | |
| 15 | 1.8 | 80 | | 5 | | | | | | | 15 | |
| 16 | 2.6 | 84 | | | 11 | | | | | | 5 | |
| 17 | 3.3 | 80 | 2 | | | 10 | | | | 2 | | 6 |
| 18 | 1.7 | 90 | | | 7 | | 0.3 | | 3 | | | |
| 19 | 1.5 | 69 | 2 | 20 | 2 | 1 | | | | | 3 | 3 |

TABLE I-continued

| Ink No. | Dye Content | Water | PG | DEG | NMP | DMK | NaOH | Na Stearate | IPA | MEOH | 2P | MIBK |
|---|---|---|---|---|---|---|---|---|---|---|---|---|
| 20 | 1.6 | 91 | | | 4 | | | | | | 5 | |

TABLE II

| Ink No. | Dye Content | Water | PG | DEG | NMP | CET | TBT | Na Stearate | BDL | PHO | 2P | PI2 |
|---|---|---|---|---|---|---|---|---|---|---|---|---|
| 21 | 3.0 | 80 | 15 | | | 0.2 | | | | | 5 | |
| 22 | 2.0 | 90 | | 5 | | | | | | 1.2 | | 5 |
| 23 | 1.5 | 85 | 5 | 5 | | 0.15 | 5.0 | 0.2 | | | | |
| 24 | 2.5 | 90 | | 6 | 4 | | | | | 0.12 | | |
| 25 | 3.1 | 82 | 4 | 8 | | 0.3 | | | | | | 6 |
| 26 | 0.9 | 85 | | 10 | | | | | 5 | 0.2 | | |
| 27 | 1.5 | 90 | | 5 | 5 | | | 0.3 | | | | |
| 28 | 2.9 | 70 | | 10 | 4 | | | | 1 | | 4 | 11 |
| 29 | 2.2 | 75 | 4 | 10 | 3 | | | | 2 | | 6 | |
| 30 | 2.6 | 91 | | | 6 | | | | | | 3 | |
| 31 | 3.2 | 76 | | 9 | 7 | | 3.0 | | | 0.95 | 5 | |
| 32 | 4.0 | 78 | 5 | 11 | | | | | | | 6 | |
| 33 | 3.3 | 86 | | | 7 | | | | | | 7 | |
| 34 | 1.1 | 70 | 5 | 5 | 5 | 0.1 | 0.2 | 0.1 | 5 | 0.1 | 5 | 5 |

EXAMPLE 2

Preparation of an ink containing the compound of Formula (8) in which W is H

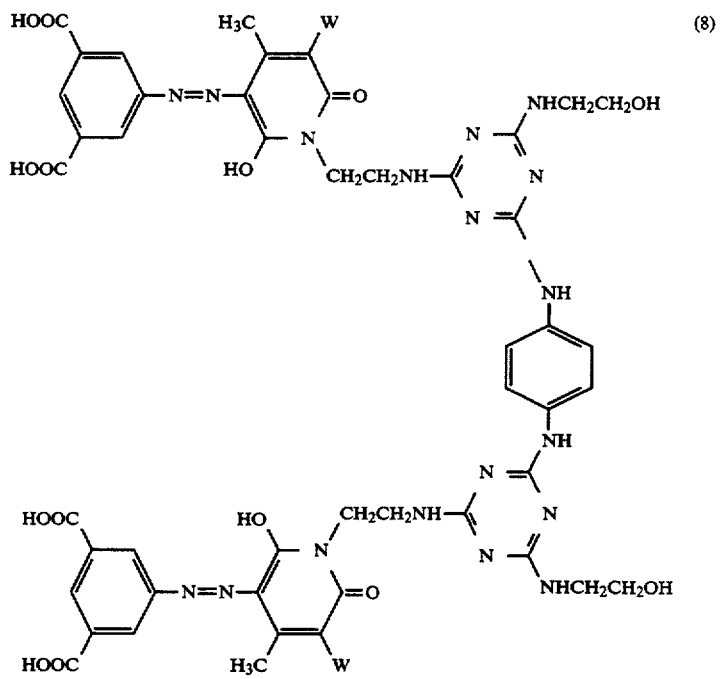

(8)

5-Aminoisophthalic acid (9.05 g) was stirred in water (150 ml) and the pH adjusted to 8-9 by addition of 2N sodium hydroxide solution. 2N Sodium nitrite (25 ml) was added and the solution added to a mixture of concentrated hydrochloric acid (25 ml) and water (200 ml) at 0°-5° C. After 2 hours the excess nitrous acid was removed by addition of a little sulphamic acid, to give a solution of diazonium salt.

A mixture of 1-(2-aminoethyl)-6-hydroxy-4-methylpyrid-2-one (8.4g), water (300 ml), sodium acetate (12.5g) and 2N sodium hydroxide (40 ml) was stirred at 0°-5° C. and the above solution of diazonium salt added at 0°-5° C. The mixture was stirred for 18 hours at 0°-5° C. It was filtered, washed with water and dried to give 20.5 g of azo pyridone compound.

18.0 g of the above azo pyridone compound was stirred in water (300 ml) and cooled to 0°-5° C. A solution of cyanuric chloride (10 g, one equivalent) in acetone (100 ml) was added at 0°-5° C. maintaining the pH at 7-8 by addition of 2N sodium hydroxide. After 3 hours the temperature was raised to 20°-25° C. and a solution of 1,4-phenylenediamine (2.16 g, ½ equivalent) in acetone (25 ml) added, maintaining the pH at 7-8. The mixture was stirred for 18 hours at 20°-25° C. maintaining the pH at 7-8.

The mixture was then acidified to pH 5 with concentrated hydrochloric acid, filtered, washed and dried to give 24.6 g of a bis(monochlorotriazine) intermediate compound.

11.46 g of the bis(monochlorotriazine) intermediate compound was stirred in water (150 ml) and 2-aminoethanol (9.2 g) added. The mixture was heated to 65° C. and stirred at 65°–70° C. for 12 hours. It was then acidified to pH 5, sodium chloride (30 g) added, and the product filtered off.

The product was then added to water (150 ml) and the pH adjusted to 9.0 with sodium hydroxide solution. The solution was added to a mixture of concentrated hydrochloric acid (20 ml) and water (200 ml) to precipitate the title compound in free acid form.

The title compound was filtered off and converted to the ammonium salt by adding to water (250 ml) and adjusting the pH to 9.0 by addition of concentrated ammonium hydroxide.

The solution was dialysed to remove chloride ions, screened and evaporated to give the ammonium salt of the title compound.

Yield = 8.0 g.

The title compound my be made into an ink by dissolving 2 parts in water:2-pyrollidone (90:10) and adding 0.2 parts of sodium borate.

Further inks may be prepared according to the formulations described in Example 1, Tables I and II wherein the title product is used as dye in the amounts indicated.

EXAMPLE 3

Ink containing the compound of Formula (8) in which W is CN

In place of the 8.4 g of 1-(2-aminoethyl)-6-hydroxy-4-methylpyrid-2-one used in Example 2 there was used 8.95 g of 1-(2-aminoethyl)-3-cyano-6-hydroxy-4-methylpyrid-2-one. The ammonium salt of the title compound when made into an ink by dissolving 3 parts in water:N-methyl pyrollidone (90:10) and printed onto plain paper using a thermal ink-jet printing machine gives yellow prints having excellent water fastness.

Further inks may be prepared according to the formulations described in Example 1, Tables I and II wherein the title product is used as dye in the amounts indicated.

EXAMPLE 4

Inks containing the compound of Formula (8) in which W is $CONH_2$

In place of the 8.4 g of 1-(2-aminoethyl)-6-hydroxy-4-methylpyrid-2-one used in Example 2 there was used 10.55 g of 1-(2-aminoethyl)-3carbonamido-6-hydroxy-4-methylpyrid-2-one. The ammonium salt of the title compound when made into an ink by dissolving 2 parts in water and printed onto plain paper using a thermal ink-jet printing machine gave yellow shades having excellent water fastness.

EXAMPLE 5

Ink containing the compound of Formula (9) in which X is $N(C_2H_4OH)_2$ and Y is $CH_3$

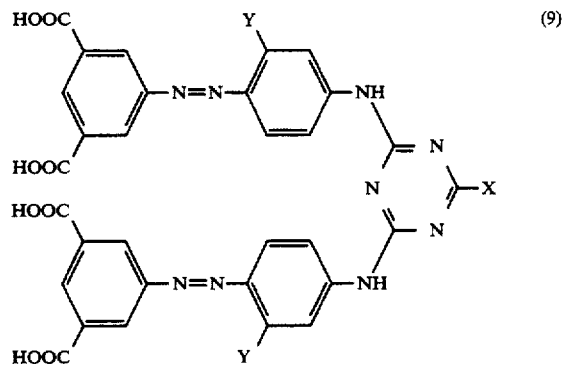

In place of the 10 g of 2-aminoethanol used in Example 1 there was used 17.2 g of diethanolamine. The ammonium salt of the title compound when made into an ink (2 parts in water/diethylene glycol 60:40) and printed onto plain paper using a thermal ink-jet printing machine gave yellow shades having excellent water fastness.

Further inks may be prepared according to the formulations described in Example 1, Tables I and II wherein the title product is used as dye in the amounts indicated.

EXAMPLE 6

Ink containing the compound of Formula (9) in which X is morpholino and Y is $CH_3$ In place of the 10 g of 2-aminoethanol used in Example 1 there was used 14.3 g of morpholine. The ammonium salt of the title compound when made into an ink by dissolving in water:diethylene glycol 92:8 and printed onto plain paper using a thermal ink-jet printing machine gave yellow shades having excellent water fastness.

Further inks may be prepared according to the formulations described in Example 1, Tables I and II wherein the title product is used as dye in the amounts indicated.

EXAMPLE 7

Ink containing the compound of Formula (9) in which X is OH and Y is $CH_3$

In place of the 10 g of 2-aminoethanol used in Example 1 there was used 6.5 g of sodium hydroxide. The ammonium salt of the title compound when made into an ink by dissolving in water:diethylene glycol 92:8 and printed onto plain paper using a thermal ink-jet printing machine gave yellow shades having excellent water fastness.

Further inks may be prepared according to the formulations described in Example 1, Tables I and II wherein the title product is used as dye in the amounts indicated.

EXAMPLE 8

Ink containing the compound of Formula (9) in which X is NHCH$_2$CH$_2$OH and Y is H 5-Aminoisophthalic acid (36.2 g) was diazotised as in Example 1.

Aniline w-methane sulphonate (70 g) was added to water (400 ml) to dissolve. The solution was added to the above diazo suspension at 0°–10° C. and pH 7. The mixture was then stirred for 18 hours at 20° C.

The product was salted to 20% using sodium chloride, stirred for 2 hours, acidified to pH 4 with concentrated hydrochloric acid and then filtered.

The paste was added to a mixture of water (2 l) and sodium hydroxide (80 g) and heated at 70°–80° C. for 3 hours. It was cooled to 20° C. and salted to 20% using sodium chloride and acidified to pH 3 using concentrated hydrochloric acid. The product was filtered and dried to give the monoazo compound.

7.62 g (one equivalent) of the above monoazo compound was added to water (500 ml) and the pH adjusted to 8 by addition of 2N sodium hydroxide solution.

It was cooled to 0°–10° C. and a solution of cyanuric chloride (50 g; one equivalent) in acetone (50 ml) added maintaining the pH at 7 and a temperature of 0°–10° C. After 1 hour a further solution of one equivalent of the above monoazo compound (7.62 g) in water (500 ml) at pH 8.0 was added and the reaction mixture warmed to 30° C. and stirred for 18 hours at 25–30° C. The pH was adjusted to 5.0 with concentrated hydrochloric acid and the product filtered.

It was slurried in water (500 ml) and 2-aminoethanol (10 g) added and the mixture heated to 80° C. After stirring at 80° C. for 4 hours the product was salted to 30% with ammonium chloride and the mixture cooled to 20° C. The product was filtered and washed with saturated ammonium chloride solution.

The above product was dissolved in water (400 ml) by addition of concentrated ammonium hydroxide solution and added to a mixture of water (200 g) and concentrated hydrochloric acid (30 g) to precipitate the title compound in free acid form. It was filtered, washed and added to water (200 ml). The pH was adjusted to 9.0 with concentrated ammonium hydroxide solution and the solution dialysed to remove chloride ions, screened and evaporated.

The ammonium salt of the title compound when made into an ink by dissolving 3 parts in water:diethyleneglycol:propane-1,2-diol (80:10:10) and printed onto plain paper using a thermal ink jet printing machine gives bright yellow shades with very good water fastness.

Further inks may be prepared according to the formulations described in Example 1, Tables I and II wherein the title product is used as dye in the amounts indicated potassium phosphate (0.9 parts) may be added to each of these inks to improve their properties.

EXAMPLE 9

Ink containing the compound of Formula (9) in which X is N(C$_2$H$_4$OH)$_2$ and Y is H In place of the 10 g of 2-aminoethanol used in Example 8 there was used 15.75 g of diethanolamine. The ammonium salt of the title compound when made into an ink and printed onto plain paper using a thermal ink-jet printing machine gave bright yellow shades with very good water fastness.

Further inks may be prepared according to the formulations described in Example 1, Tables I and II wherein the title product is used as dye in the amounts indicated.

EXAMPLE 10

Ink containing the compound of Formula (9) in which X is morpholino and Y is H

In place of the 10 g of 2-aminoethanol used in Example 8 there was used 14.3 g of morpholine. The ammonium salt of the title compound when made into an ink and printed onto plain paper using a thermal ink-jet printing machine gave bright yellow shades with very good water fastness.

EXAMPLE 11

Ink containing the compound of Formula (10) in which W is H and X is NHCH$_2$CH$_2$OH

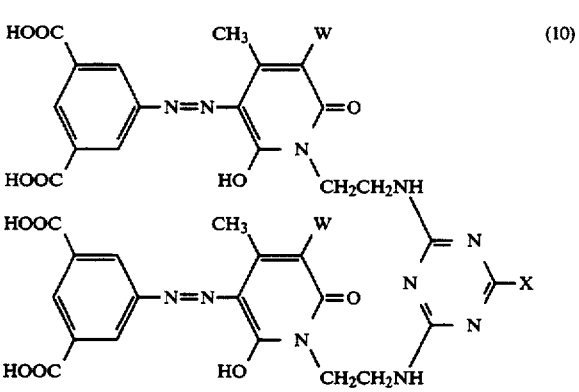

5-Aminoisophthalic acid was diazotised and coupled onto 1-(2-aminoethyl)-6-hydroxy,4,methylpyrid-2-one as in Example 2. It was then condensed with one equivalent of cyanuric chloride as in Example 2. A further equivalent of monoazo compound was then added, the temperature raised to 45° C. and the pH maintained at 7–8 for 4 hours.

2-Aminoethanol (5 g) was then added and the mixture heated at 65–70° C. for 6 hours.

The reaction mixture was cooled to 20° C. and the pH adjusted to 5 with concentrated hydrochloric acid. The product was filtered and reslurried in water (150 ml) and the pH adjusted to 9.0 with sodium hydroxide solution. The solution was added to a mixture of water (200 ml) and concentrated hydrochloric acid (20 ml) to precipitate the title compound in free acid form.

It was filtered off and converted to the ammonium salt by adding to water (250 ml) and adjusting the pH to 9.0 by addition of concentrated ammonium hydroxide. The solution was dialysed to remove chloride tons, screened and evaporated.

When made into an ink the by dissolving 3 parts in water:diethyleneglycol (80:20) and printed onto plain paper using a thermal ink jet printing machine it gave bright yellow shades with excellent water fastness.

EXAMPLE 12

Ink containing the compound of Formula (9) in which X is N(CH$_3$)C$_2$H$_4$OH and Y is H In place of the 10 g of 2-aminoethanol used in Example 8 there are used 12.3 g of 2-(methylamino)ethanol. The ammonium salt of the title compound when made into an ink and printed onto plain paper using a thermal ink-jet printing machine gives bright yellow shades with very good water fastness.

Further inks may be prepared according to the formulations described in Example 1, Tables I and II wherein the title product is used as dye in the amounts indicated.

EXAMPLE 13

Ink containing the compound of Formula (9) in which X is $N(C_2H_5)C_2H_4OH$ and Y is H In place of the 10 g of 2-aminoethanol used in Example 8 there are used 14.6 g of 2-(ethylamino)ethanol. The ammonium salt of the title compound when made into an ink and printed onto plain paper using a thermal ink-jet printing machine gives bright yellow shades with very good water fastness.

Further inks my be prepared according to the formulations described in Example 1, Tables I and II wherein the title product is used as dye in the amounts indicated.

EXAMPLE 14

Ink containing the compound of Formula (9) in which X is $NH.nC_4H_9$ and Y is H In place of the 10 g of 2-aminoethanol used in Example 8 there was used 12 g of n-butylamine. The ammonium salt of the title compound when made into an ink and printed onto plain paper using a thermal ink-jet printing machine gave bright yellow shades with very good water fastness.

Further inks my be prepared according to the formulations described in Example 1, Tables I and II wherein the title product is used as dye in the amounts indicated.

EXAMPLE 15

Ink containing the compound of Formula (9) in which X is $NH-nC_6H_{13}$ and Y is H In place of the 10 g of 2-aminoethanol used in Example 8 there was used 16.6 g of n-hexylamine. The ammonium salt of the title compound when made into an ink and printed onto plain paper using a thermal ink-jet printing machine gave bright yellow shades with very good water fastness.

Further inks may be prepared according to the formulations described in Example 1, Tables I and II wherein the title product is used as dye in the amounts indicated.

EXAMPLE 16

Ink containing the compound of Formula (9) in which X is $NH(CH_2)_6OH$ and Y is H In place of the 10 g of 2-aminoethanol used in Example 8 there was used 19.2 g of 6-amino-1-hexanol. The ammonium salt of the title compound when made into an ink and printed onto plain paper using a thermal ink-jet printing machine gave bright yellow shades with very good water fastness.

EXAMPLE 17

Ink containing the compound of Formula (11) in which X is $NHCH_2CH_2OH$ and Y is $OCH_3$

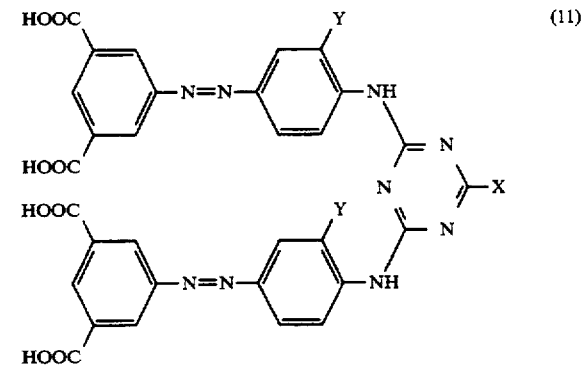

In place of the 70 g of aniline-w-methane sulphonate used in Example 8 there was used 81.2 g of o-anisidine-w-methane sulphonate. The ammonium salt of the title compound when made into an ink and printed onto plain paper using a thermal ink-jet printing machine gave bright yellow shades with very good water fastness.

Further inks my be prepared according to the formulations described in Example 1, Tables I and II wherein the title product is used as dye in the amounts indicated.

EXAMPLE 18

Ink containing the compound of Formula (11) in which X is morpholino and Y is $OCH_3$ In place of the 10 g of 2-aminoethanol used in Example 17 there was used 14.3 g of morpholine. The ammonium salt of the title compound when made into an ink and printed onto plain paper using a thermal ink-jet printing machine gave bright yellow shades with good water fastness.

Further inks may be prepared according to the formulations described in Example 1, Tables I and II wherein the title product is used as dye in the amounts indicated.

EXAMPLE 19

Ink containing the compound of Formula (12) in which X is $NHCH_2CH_2OH$, Y is $CH_3$ and Z is H

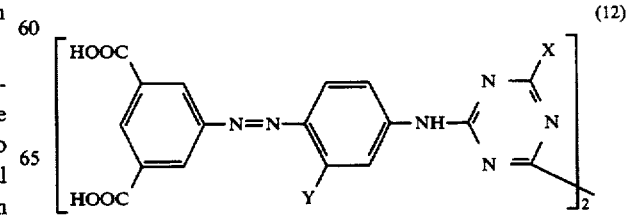

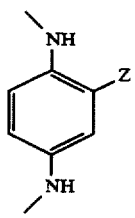

The monoazo compound made by coupling diazotised 5-aminoisophthalic acid with m-toluidine was prepared as in Example 1. 22.4 g of this monoazo compound was added to water (450 ml) and the pH adjusted to 8.0 by addition of 47% sodium hydroxide solution. It was cooled to 0°–10° C. and a solution of cyanuric chloride (15 g) in acetone (150 ml) added maintaining the pH at 7–8 and a temperature of 0°–10° C. After 3 hours a solution of p-phenylenediamine (3.24 g) in acetone (30 ml) was added and the reaction mixture stirred at 25° C. and pH 7–8 for 18 hours. The reaction mixture was acidified to pH 5 with 2N hydrochloric acid and the product filtered off and pulled dry.

It was added to water (750 ml) and 2-aminoethanol (27.6 g) added. The temperature was raised to 65° C. and stirred at 65°–75° C. for 6 hours. After cooling to 20° C. the reaction mixture was acidified to pH 5 with concentrated hydrochloric acid and the title product filtered off. It was added to water (400 ml) and the pH adjusted to 9.0 with concentrated ammonium hydroxide and the solution dialysed to remove chloride ions, screened and evaporated. The ammonium salt when made into an ink by dissolving 2.5 parts in water:diethyleneglycol:sodium oxalate (80:20:0.2) and printed onto plain paper using a thermal ink jet printer gives bright yellow shades with excellent water fastness.

Further inks may be prepared according to the formulations described in Example 1, Tables I and II wherein the title product is used as dye in the amounts indicated.

EXAMPLE 20

Inks containing the compound of Formula (12) in which X is $N(C_2H_4OH)_2$, Y is $C_3$ and Z is H In place of the 27.6 g of 2-aminoethanol used in Example 19 there was used 47.5 g of diethanolamine. The ammonium salt of the title compound when made into an ink and printed onto plain paper using a thermal ink-jet printing machine gave bright yellow shades with excellent water fastness.

Further inks may be prepared according to the formulations described in Example 1, Tables I and II wherein the title product is used as dye in the amounts indicated.

EXAMPLE 21

Inks containing the compound of Formula (12) in which X is morpholino, Y is $CH_3$ and Z is H In place of the 27.6 g of 2-aminoethanol used in Example 19 there was used 39.4 g of morpholine. The ammonium salt of the title compound when made into an ink and printed onto plain paper using a thermal ink-jet printing machine gave bright yellow shades with excellent water fastness.

Further inks may be prepared according to the formulations described in Example 1, Tables I and II wherein the title product is used as dye in the amounts indicated.

EXAMPLE 22

Inks containing the compound of Formula (12) in which X is $NHCH_2CH_2CH_2OH$, and Y and Z are H In place of the 22.4 g of the monoazo compound used in Example 19 there was used 21.4 g of the monoazo compound made by coupling diazotised 5-aminoisophthalic acid with aniline- -methane sulphonate followed by removal of the -methane sulphonate group as prepared in Example 8. When made into an ink and printed onto plain paper using a thermal ink-jet printing machine it gave bright yellow shades with very good water fastness.

Further inks may be prepared according to the formulations described in Example 1, Tables I and II wherein the title product is used as dye in the amounts indicated.

EXAMPLE 23

Inks containing the compound of Formula (12) in which X is $N(C_2H_4OH,)_2$, and Y and Z are H In place of the 27.6 g of 2-aminoethanol used in Example 22 there was used 47.5 g of diethanolamine. The ammonium salt of the title compound when printed onto plain paper using a thermal ink-jet printing machine it gave bright yellow shades having good water fastness.

Further inks may be prepared according to the formulations described in Example 1, Tables I and II wherein the title product is used as dye in the amounts indicated.

EXAMPLE 24

Inks containing the compound of Formula (13compound in which X is H, Y is $NHCH_2CH_2OH$, and Z is $CH_3$

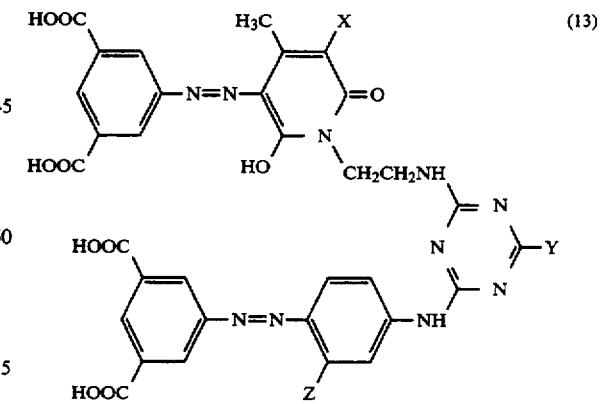

(13)

10.8 g of the monoazo dye made by coupling diazotised 5-aminoisophthalic acid with 1-(2-aminoethyl)-6-hydroxy-4-methylpyrid-2-one prepared as in Example 2 was stirred in water (1l) and the pH adjusted to 8.0. It was cooled to 0°–5° C. and a solution of cyanuric chloride (5.5 g) in acetone (100 ml) was added at 0°–5° C. maintaining the pH at 7–8 by addition of 2N sodium hydroxide. After 3 hours, 9 g of the monoazo dye made by coupling 5-aminoisophthalic acid with m-toluidine prepared as in Example 1 was added and the mixture warmed to 40°–45° C. It was stirred at this temperature, maintaining the pH at 7 for 4 hours. Ethanolamine (20 g) was then added, the temperature raised to 80° C. and stirred at this temperature for 2 hours. After cooling to 20° C. it was acidified to pH 5 with concentrated hydrochloric acid and the product filtered off and padded dry, it was added to water (400 ml) and the pH adjusted to 9 by addition of concentrated ammonium hydroxide. The solution was dialysed to remove chloride ions, screened and evaporated to give the ammonium salt of the title product. When made into an ink and printed onto plain paper using a thermal ink jet printer it gave bright yellow shades with very good water fastness.

Further inks my be prepared according to the formulations described in Example 1, Tables I and II wherein the title product is used as dye in the amounts indicated.

EXAMPLE 25

Inks containing the compound of Formula (14) in which X is morpholino

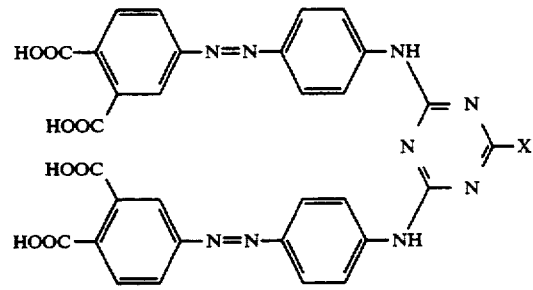

(14)

In place of the 5-aminoisophthalic acid used in Example 10 there is used an equal amount of 4-aminophthalic acid. The ammonium salt of the title compound when made into an ink and printed onto plain paper using a thermal ink-jet printing machine gives bright yellow shades having very good water fastness.

Further inks may be prepared according to the formulations described in Example 1, Tables I and II wherein the title product is used as dye in the amounts indicated.

EXAMPLE 26

Inks containing the Compound of Formula (15) in which X is morpholino

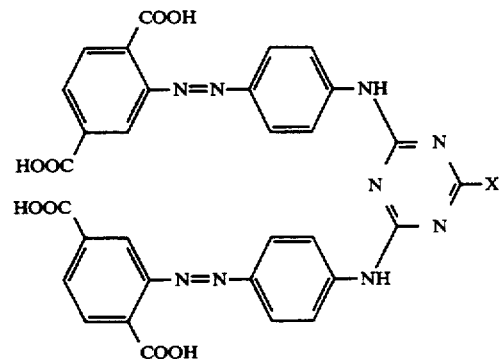

(15)

In place of the 5-aminoisophthalic acid used in Example 10 there is used an equal amount of 2-aminoterephthalic acid. The ammonium salt of the title compound when made into an ink in water and printed onto plain paper using a thermal ink-jet printing machine gives bright yellow shades having very good water fastness.

Further inks may be prepared according to the formulations described in Example 1, Tables I and II wherein the title product is used as dye in the amounts indicated.

EXAMPLE 27

Inks containing the compound of Formula (16) in which X is morpholino

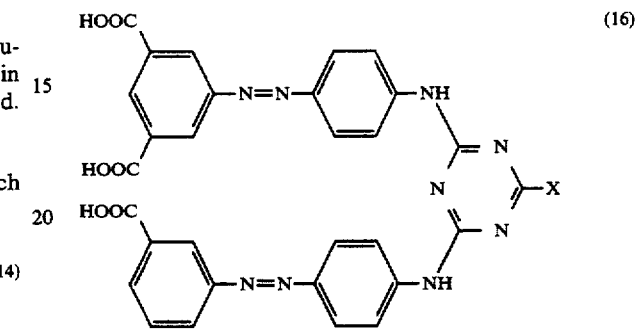

(16)

3-Aminobenzoic acid (13.7 g) is stirred in water (250 ml) and the pH adjusted to 8-9 by addition of sodium hydroxide solution. Sodium nitrite (6.9 g) is added and the solution added to a mixture of concentrated hydrochloric acid (20 ml) and water (100 ml) at 0°-10° C. After 1 hour at 0°-10° C., the excess nitrous acid is removed by addition of a little sulphamic acid.

Aniline w-methane sulphonate (21 g) is added to water (150 ml) to dissolve. The solution is added to the above diazo solution at 0°-10° C. and pH 7. The mixture is stirred at 20° C. for 18 hours. The product is salted to 20% using sodium chloride, stirred 1 hour and acidified to pH 4 with concentrated hydrochloric acid and then filtered.

The paste is added to a mixture of water (700 ml) and sodium hydroxide (40 g) and heated at 70°-80° C. for 3 hours. It is cooled to 20° C. and salted to 20% using sodium chloride and acidified to pH 3 using concentrated hydrochloric acid. The product is filtered and dried to give the monoazo compound (A).

5-aminoisophthalic acid is diazotised and coupled onto aniline-methane sulphonate as in Example 8. It is then heated with aqueous sodium hydroxide to remove the -methane sulphonate group as in Example 8 and 7.62 g (1 equivalent) of this product condensed with cyanuric chloride as described in Example 8. After 1 hour, 6.5 g (1 equivalent) of the above monoazo compound (A) in water (500 ml) is added. The pH is adjusted to 8 and the reaction mixture stirred at 25°-30° C. for 18 hours. The pH is adjusted to 5.0 with concentrated hydrochloric acid and the product filtered.

The product is added to water (500 g) and morpholine (14.3 g) added and the mixture warmed to 80° C. After stirring at 80° C. for 4 hours, the mixture is salted to 30% with ammonium chloride and then cooled to 20° C. and filtered.

The ammonium salt when made into an ink and printed onto plain paper using a thermal ink jet printer gives bright yellow shades with very good water fastness.

Further inks may be prepared according to the formulations described in Example 1, Tables I and II wherein the title product is used as dye in the amounts indicated.

EXAMPLE 28

Inks containing the compound of Formula (17)

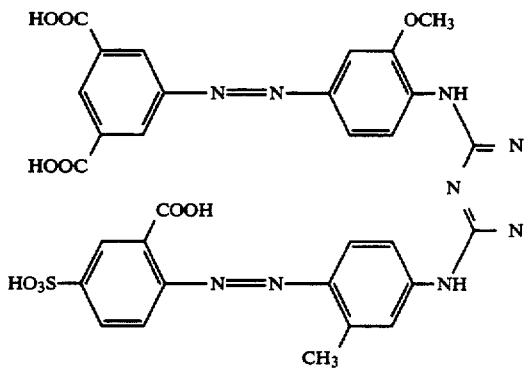

2-Amino-5-sulphobenzoic acid (21.7 g) was added to a mixture of water (300 ml) and concentrated hydrochloric acid (30 ml) and the mixture cooled to 0°–10° C. A solution of sodium nitrite (7.0 g) in water (50 ml) was added dropwise and the mixture stirred at 0°–10° C. for 1 hour. The slight excess of nitrous acid was removed with sulphamic acid and then the mixture added slowly to a solution of m-toluidine (10.7 g) in water (200 ml) and concentrated hydrochloric acid (12.5 ml) at 0°–10° C. The pH was adjusted to 4.0 and the mixture stirred for 18 hours at 0°–10° C. The monoazo compound was filtered off and dried.

6.3 g of the monoazo compound prepared from 5-aminoisophthalic acid and o-anisidine prepared as in Example 17 was added to water (500 ml) and the pH adjusted to 8.0 by addition of 47% sodium hydroxide solution. It was cooled to 0°–10° C. and a solution of cyanuric chloride (3.69 g) in acetone (50 ml) was added maintaining the pH at 7–8 and a temperature of 0°–10° C. After 30 minutes 6.7 g of the monoazo compound prepared above from 2-amino-5-sulphobenzoic acid and m-toluidine in water (500 ml) was added at pH 8.0 and the reaction mixture warmed to 40° C. and stirred at this temperature for 4 hours maintaining the pH at 7–8.

2-Aminoethanol (8 g) was then added and the mixture heated to 80° C. After stirring at 80° C. for 4 hours the pH was adjusted to 7.0 and salted to 20% using sodium chloride. The product was filtered and washed with saturated brine. It was converted to the ammonium salt as in Example 1, dialysed, screened and evaporated. When made into an ink and printed onto plain paper using a thermal ink jet printer it gave bright yellow shades with high water fastness.

Further inks may be prepared according to the formulations described in Example 1, Tables I and II wherein the title product is used as dye in the amounts indicated.

EXAMPLE 29

Inks containing the compound of Formula (18)

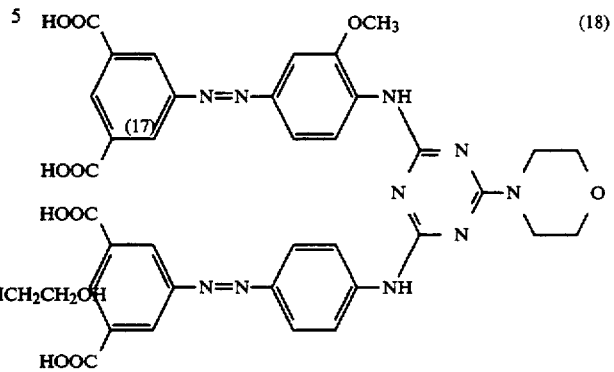

In place of the 6.7 g of the monoazo compound derived from 2-amino-5-sulphobenzoic acid and m-toluidine used in Example 28 there is used 5.7 g of the monoazo compound from 5-aminoisophthalic acid and aniline as prepared in Example 8 and in place of the 8 g of 2-aminoethanol there is used 11 g of morpholine. The ammonium salt of the title compound when made into an ink and printed onto plain paper using a thermal ink jet printing machine gives bright yellow shades with very good water fastness.

Further inks my be prepared according to the formulations described in Example 1, Tables I and II wherein the title product is used as dye in the amounts indicated.

EXAMPLE 30

Inks containing the compound of Formula (12compound in which X is morpholino, Y is H and Z are $CO_2H$ In place of the 3.24 g of p-phenylenediamine used in Example 22 there is used 4.6 g of 2,5-diaminobenzoic acid and in place of the 27.6 g of 2-aminoethanol there is used 39.3 g of morpholine.

The ammonium salt of the title compound when made into an ink and printed onto plain paper using a thermal ink-jet printing machine gives bright yellow shades having high water fastness.

Further inks my be prepared according to the formulations described in Example 1, Tables I and II wherein the title product is used as dye in the amounts indicated.

EXAMPLE 31

In place of the 10 g of 2-aminoethanol used in Example 1 there is used 10 g of 4-(aminomethyl)benzoic acid. The product as the ammonium salt when made into an ink and printed onto plain paper using a thermal ink-jet printer gives bright yellow shades with excellent water fastness.

Further inks may be prepared according to the formulations described in Example 1, Tables I and II wherein the title product is used as dye in the amounts indicated.

EXAMPLE 32

The method of Example 10 my be repeated except that in place of adjusting the pH to 9.0 with concentrated ammonia there is used 40% aqueous dimethylamine solution to give the compound of Example 10 in the form of its dimethylammonium salt.

An ink my be prepared by dissolving 2 parts of the product in 100 parts of water/diethyleneglycol (92.5:7.5).

Further inks may be prepared according to the formulations described in Example 1, Tables I and II wherein the title product is used as dye in the amounts indicated.

EXAMPLE 33

The method of Example 8 may be repeated except that in place of adjusting the pH to 9 with concentrated ammonia there is used 40% aqueous dimethylamine solution to give the compound of Example 8 in the form of its dimethylammonium salt.

An ink my be prepared by dissolving 2 parts of the product in 100 parts of water/diethylene glycol (92.5/7.5).

Further inks my be prepared according to the formulations described in Example 1, Tables I and II wherein the title product is used as dye in the amounts indicated.

EXAMPLE 34

The method of Example 15 may be repeated except that in place of adjusting the pH to 9 with concentrated ammonia there is used 40% aqueous dimethylamine solution to give the compound of Example 15 in the form of its dimethylammonium salt.

An ink my be prepared by dissolving 2 parts of the product in 100 parts of water/diethylene glycol (90/10).

Further inks may be prepared according to the formulations described in Example 1, Tables I and II wherein the title product is used as dye in the amounts indicated.

EXAMPLE 35

The method of Example 6 may be repeated except that in place of adjusting the pH to 9 with concentrated ammonia there is used 40% aqueous dimethylamine solution to give the compound of Example 6 in the form of its dimethylammonium salt. An ink may be prepared by dissolving 2 parts of the product in 100 parts of water/diethylene glycol (92.5/7.5).

Further inks my be prepared according to the formulations described in Example 1, Tables I and II wherein the title product is used as dye in the amounts indicated.

EXAMPLE 36

The method of Example 1 my be repeated except that in place of adjusting the pH to 9 with concentrated ammonia there is used 40% aqueous dimethylamine solution to give the compound of Example 1 in the form of its dimethylamine salt.

An ink my be prepared by dissolving 2 parts of the product in water/diethylene glycol (92.5/7.5).

Further inks may be prepared according to the formulations described in Example 1, Tables I and II wherein the title product is used as dye in the amounts indicated.

EXAMPLE 37

The method of Example 6 may be repeated except that in place adjusting the pH to 9 with concentrated ammonia there is used 40% aqueous dimethylamine solution to give the compound of Example 1 in the form of its dimethylamine salt.

An ink may be prepared by dissolving 2 parts of the product in water/diethylene glycol (92.5/7.5).

Further inks my be prepared according to the formulations described in Example 1, Tables I and II wherein the title product is used as dye in the amounts indicated.

EXAMPLE 38

The method of Example 10 my be repeated except that in place of adjusting the pH to 9 with concentrated ammonia there is used diethylamine to give the compound of Example 10 in the form of its diethylamine salt.

An ink my be prepared by dissolving 2 parts of the product in 100 parts of water/N-methyl-pyrollidone (92.5/7.5).

Further inks may be prepared according to the formulations described in Example 1, Tables I and II wherein the title product is used as dye in the amounts indicated.

EXAMPLE 39

Preparation of the compound of Formula (9) in which X is NH-$_n$C$_6$H$_{13}$ and Y is methyl The method of Example 1 my be repeated except that in place of 2-aminoethanol there may be used an equimolar amount of hexylamine. The resultant product my be made into inks according to Tables I and II in Example 1 and printed onto plain paper.

We claim:

1. An ink comprising a liquid medium and a compound of Formula (1) or salt thereof:

$$Ar-N=N-J-N-X-\left[\begin{array}{c}N-R^2\\|\\L\\|\\N-R^3\end{array}\right]$$
$$Ar^1-N=N-J^1-N-X\Bigg]_n$$
$$\phantom{Ar^1-N=N-J^1-N}|\phantom{X}$$
$$\phantom{Ar^1-N=N-J^1-N}R^4$$

wherein:
Ar and Ar$^1$ are each independently aryl or substituted aryl providing at least one of Ar and Ar$^1$ has at least one substituent selected from COOH and COSH;
J and J$^1$ are each independently of formula (2), (3) or (4):

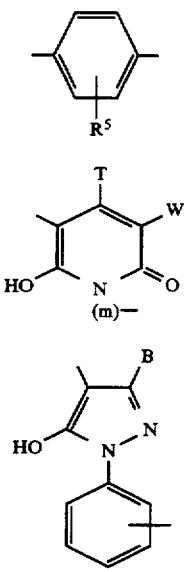

each $R^5$ is independently selected from H, alkyl, substituted alkyl, alkoxy, halogen, CN, ureido and NHCOR$^6$;

$R^6$ is H, alkyl, substituted alkyl, aryl, substituted aryl, aralkyl or substituted aralkyl;

each T is independently alkyl;

each W is independently selected from H, CN, CONR$^{10}$R$^{11}$, pyridinium and COOH;

each m is an alkylene chain having 2 to 8 carbon atoms; B is H, alkyl or COOH;

$R^1$, $R^2$, $R^3$, $R^4$, $R^{10}$ and $R^{11}$ are each independently H, alkyl or substituted alkyl:

L is a divalent organic linking group;

n is 0 or 1;

each X is independently carbonyl or a group of the Formula (5), (6) or (7):

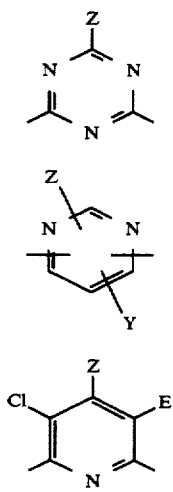

Z is OR$^7$, SR$^7$ or NR$^8$R$^9$;

Y is H, Cl, CN or Z;

E is Cl or CN;

$R^7$, $R^8$ and $R^9$ are independently H, alkenyl, substituted alkenyl, alkyl, substituted alkyl, aryl, substituted aryl, aralkyl or substituted aralkyl, or $R^8$ and $R^9$ together with the nitrogen atom to which they are attached form a 5 or 6 membered ring;

provided the compound of Formula (1) has no —SO$_3$H groups and at least two COOH groups.

2. An ink according to claim 1 which contains less than 5% inorganic salts.

3. An ink according to claim 1 wherein the liquid medium comprises water and one or more water-soluble organic solvents.

4. An ink according to claim 1 where the compound has at least three —COOH groups.

5. An ink according to claim 3 which contains less than 1% inorganic salts and the weight ratio of water to the solvent(s) is from 95:5 to 50:50.

6. An ink according to claim 5 wherein each of Ar and and Ar$^1$ has at least one —COOH substituent.

7. An ink according to claim 6 wherein each of Ar and and Ar$^1$ has at least two —COOH substituents.

8. An ink according to claim 7 wherein each of Ar and and Ar$^1$ is dicarboxyphenyl.

9. An ink according to any one of preceding claims wherein X is a group of Formula (5) and Z is selected from —NHC$_2$H$_4$OH, —N(C$_2$H$_4$OH,)$_2$, —NH(C$_{1-6}$-alkyl) and morpholino.

10. An ink according to claim 1 wherein the compound is in the form of a salt with a volatile amine.

11. An ink according to claim 1 wherein the compound is in the form of its dimethylammonium salt.

12. In a process for printing a substrate with an ink using an ink jet printer, said process comprising forming the ink into small droplets by ejection from a reservoir through a jet so that droplets of ink are directed at the substrate, the improvement wherein the ink is as defined in claim 1 or claim 14.

13. A plain paper having acid, alkaline or neutral character printed with an ink according to claim 1 or claim 14.

14. An ink comprising a liquid medium and a compound of Formula (1) or salt thereof:

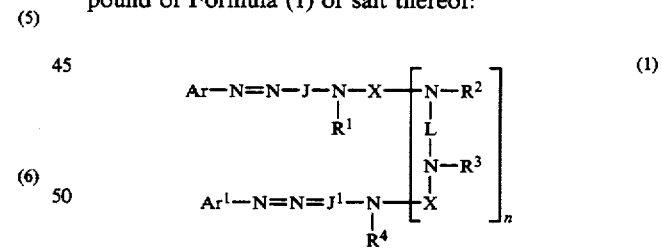

wherein:

Ar and Ar$^1$ are each independently aryl or substituted aryl providing at least one of Ar and Ar$^1$ has at least one substituent selected from COOH and COSH;

J and J$^1$ are each independently of formula (2), (3) or (4):

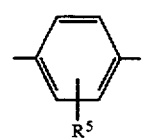

-continued

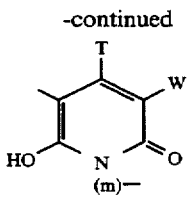
(3)

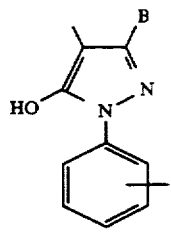
(4)

each $R^5$ is independently selected from H, alkyl, substituted alkyl, alkoxy, halogen, CN, ureido and $NHCOR^6$;

$R^6$ is H, alkyl, substituted alkyl, aryl, substituted aryl, aralkyl or substituted aralkyl;

each T is independently alkyl;

each W is independently selected from H, CN, $CONR^{10}R^{11}$, pyridinium and COOH;

each m is an alkylene chain having 2 to 8 carbon atoms;

B is H, alkyl or COOH;

$R^1$, $R^2$, $R^3$, $R^4$, $R^{10}$ and $R^{11}$ are each independently H, alkyl or substituted alkyl;

L is a divalent organic linking group;

n is 0 or 1;

each X is independently carbonyl or a group of the Formula (5), (6) or (7):

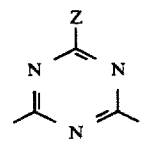
(5)

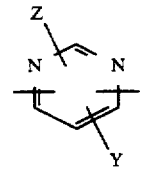
(6)

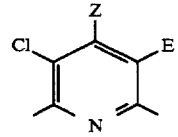
(7)

Z is $OR^7$, $SR^7$ or $NR^8R^9$;

Y is H, Cl, CN or Z;

E is Cl or CN;

$R^7$, $R^8$ and $R^9$ are independently H, alkenyl, substituted alkenyl, alkyl, substituted alkyl, aryl, substituted aryl, aralkyl or substituted aralkyl, or $R^8$ and $R^9$ together with the nitrogen atom to which they are attached form a 5 or 6 membered ring;

provided that the compound of Formula (1) has (i) at least three —COOH groups and (ii) at least as many groups selected from —COOH and COSH as —SO₃H groups.

15. An ink according to claim 14 wherein each of Ar and $Ar^1$ has at least one, —COOH group.

16. An ink according to claim 14 wherein each of Ar and $Ar^1$ has at least two —COOH groups.

17. An ink according to claim 14 wherein each of Ar and $Ar^1$ is dicarboxyphenyl.

* * * * *

UNITED STATES PATENT AND TRADEMARK OFFICE
CERTIFICATE OF CORRECTION

PATENT NO. : 5,374,301
DATED : DECEMBER 20, 1994
INVENTOR(S) : GREGORY et al.

It is certified that error appears in the above-indentified patent and that said Letters Patent is hereby corrected as shown below:

On the title page, change from:

"[30] Foreign Application Priority Data

July 26, 1990 [GB] United Kingdom...9016448
  September 24, 1992 [GB] United Kingdom...9217963"

to

--[30] Foreign Application Priority Data

July 26, 1990 [GB] United Kingdom...9016448

August 24, 1992 [GB] United Kingdom...9217963--.

Signed and Sealed this

Eleventh Day of April, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,374,301
DATED : DECEMBER 20, 1994
INVENTOR(S) : GREGORY et al.

It is certified that error appears in the above-indentified patent and that said Letters Patent is hereby corrected as shown below:

On the title page, change from:

"[30] Foreign Application Priority Data

July 26, 1990 [GB] United Kingdom...9016448
    September 24, 1992 [GB] United Kingdom...9217963"

to

--[30] Foreign Application Priority Data

July 26, 1990 [GB] United Kingdom...9016448

August 24, 1992 [GB] United Kingdom...9217963--.

Signed and Sealed this

Eleventh Day of April, 1995

Attest:

BRUCE LEHMAN

Attesting Officer      Commissioner of Patents and Trademarks